US008073495B2

(12) United States Patent
Chiu et al.

(10) Patent No.: US 8,073,495 B2
(45) Date of Patent: Dec. 6, 2011

(54) DELAYED USER NOTIFICATION OF EVENTS IN A MOBILE DEVICE

(75) Inventors: Denny Chiu, Kitchener (CA); Ahmed E. Hassan, Waterloo (CA); John F. Wilson, Waterloo (CA)

(73) Assignee: Research In Motion Limited, Waterloo, Ontario (CA)

( * ) Notice: Subject to any disclaimer, the term of this patent is extended or adjusted under 35 U.S.C. 154(b) by 0 days.

(21) Appl. No.: 12/876,578

(22) Filed: Sep. 7, 2010

(65) Prior Publication Data
US 2010/0330967 A1 Dec. 30, 2010

Related U.S. Application Data

(63) Continuation of application No. 11/564,900, filed on Nov. 30, 2006, now Pat. No. 7,813,719.

(51) Int. Cl.
*H04M 1/00* (2006.01)
*H04M 1/725* (2006.01)

(52) U.S. Cl. ............... 455/567; 455/412.2; 379/418; 379/373.01; 379/373.04; 379/374.01; 379/376.01

(58) Field of Classification Search ............... 455/412.2, 455/414.1, 414.2, 413, 415, 417, 566, 567; 379/418, 373.01–373.04, 374.01–376.01, 379/352–355.02, 372, 251–252, 201, 179, 379/164, 65, 31; 340/384.1, 393.4, 384.73, 340/392.1

See application file for complete search history.

(56) References Cited

U.S. PATENT DOCUMENTS

| 5,539,395 | A  | * | 7/1996  | Buss et al. ................... 340/7.43 |
| 5,878,351 | A  |   | 3/1999  | Alanara et al. |
| 6,643,684 | B1 |   | 11/2003 | Malkin et al. |
| 6,928,300 | B1 |   | 8/2005  | Skinner et al. |
| 6,948,135 | B1 | * | 9/2005  | Ruthfield et al. ............. 715/854 |
| 6,985,748 | B2 |   | 1/2006  | Knotts |

(Continued)

FOREIGN PATENT DOCUMENTS

WO  0131862 A1  5/2001

OTHER PUBLICATIONS

"OS/2 Office: Delayed Delivery of Mail Items". IBM Technical Disclosure Bulletin, IBM Corp. New York, US, vol. 34. No. 9, Feb. 1, 1992, pp. 381-382, XP000301917, ISSN: 0018-8689.

(Continued)

*Primary Examiner* — Charles Appiah
*Assistant Examiner* — Emem Stephen
(74) *Attorney, Agent, or Firm* — Norton Rose OR LLP

(57) ABSTRACT

A sender-specified courtesy notification scheme to delay notification by a receiving device of the receipt of a data message is disclosed. A sender may specify a notification parameter defining a delay and send the parameter in association with the data message to a recipient. The recipient's receiving device evaluates the parameter and notifies in response. Local notification data defined by the recipient may also be evaluated. Received data messages subject to delayed notification may be hidden by the receiving device or quietly displayed (e.g. as per other received messages) until the expiry of the delay. Notification parameters and data can be formulated as one or more rules which may take into account the current location of the receiving device. A notification delay may be ignored in certain situations depending on recent use of the receiving device.

16 Claims, 5 Drawing Sheets

U.S. PATENT DOCUMENTS

| | | | |
|---|---|---|---|
| 7,068,189 B2 | 6/2006 | Brescia | |
| 2004/0203644 A1* | 10/2004 | Anders et al. | 455/414.1 |
| 2004/0253963 A1* | 12/2004 | Park et al. | 455/456.2 |
| 2005/0048998 A1 | 3/2005 | Zhu | |

OTHER PUBLICATIONS

"Sender-Specified Multimedia Executable Object for Recipient Alert". IBM Technical Disclosure Bulletin, IBM Corp. New York, US vol. 36, No. 4, Apr. 1, 2993, pp. 247-248, XP000364503 ISSN: 0018-8689.

European Search Report for EP Application No. 04103307.7 issued Apr. 13, 2005.

IBM Corp., "OS/2 Office: Delayed Delivery for Mail Items", IBM Technical Disclosure Bulletin, Feb. 1992, vol. 34, No. 9, United States of America.

IBM Corp., "Sender-Specified Multimedia Executable Object for Recipient Alert", IBM Technical Disclosure Bulletin, Apr. 1993, vol. 36, No. 4, United States of America.

European Patent Office, "Communication re European Search Report" for corresponding EP 04103307.7 dated Apr. 13, 2005, Germany.

IPulse, "Response to European Search Report dated Apr. 13, 2005" for corresponding EP 04103307.7 dated Jul. 27, 2005, United Kingdom.

European Patent Office, "Communication re European Search Report" for corresponding EP 04103307.7 dated Feb. 2, 2009, Germany.

IPulse, "Response to European Search Report dated Feb. 2, 2009" for corresponding EP 04103307.7 dated May 26, 2009, United Kingdom.

European Patent Office, "Summons to Attend Oral Proceedings Pursuant to Rule 115(1) EPC" for corresponding EP 04103307.7 dated Aug. 5, 2009, Germany.

Barker Brettell, "Written Submissions re Summons dated Aug. 5, 2009" for corresponding EP 04103307.7 dated Sep. 28, 2009, United Kingdom.

European Patent Office, "Minutes of Oral Porceedings" for corresponding EP 04103307.7 dated Nov. 3, 2009, Germany.

European Patent Office, "Decision to Refuse a European Patent Application" for corresponding EP 04103307.7 dated Nov. 3, 2011, Germany.

Barker Brettell, "Notice of Appeal" for corresponding EP 04103307.7 dated Jan. 5, 2010, United Kingdom.

Barker Brettell, "Grounds for Appeal" for corresponding EP 04103307.7 dated Mar. 8, 2010, United Kingdom.

* cited by examiner

DELAYED USER NOTIFICATION OF EVENTS IN A MOBILE DEVICE

CROSS-REFERENCE TO RELATED APPLICATIONS

This application is a continuation of U.S. patent application Ser. No. 11/564,900 filed Nov. 30, 2006, which is a continuation of U.S. patent application Ser. No. 10/889,893 filed Jul. 12, 2004, the disclosures of which are both incorporated herein by reference in their entireties.

FIELD OF THE INVENTION

The present invention relates generally to wireless data communications and, more particularly, methods and apparatus for notifying a user of the occurrence of an event such as a receipt of a data communication.

DESCRIPTION OF THE RELATED ART

Wireless communications devices such as mobile devices providing voice communications, data communications or both in a wireless communication network are increasingly prevalent in modern society. Such devices may also provide additional personal digital assistant (PDA) functions such as a calendar, alarm, contact lists, calculators, etc. The occurrence of a device event such as the receipt of a new voice or data communication, a calendar appointment reminder or an alarm is notified to the user in one or more sensory ways. These notifications typically take the form of an audible signal, a vibration, and/or a visual signal. In particular, audible signals from such devices often come to the attention of persons other than the users of the devices and may be distracting or otherwise annoying to those other persons.

The responsiveness and near ubiquity of many such wireless communication device solutions providing data communication capabilities such as electronic mail (email) has transformed such communications from a send/wait/reply paradigm to a send/reply paradigm. Senders of messages expect nearly instantaneous responses and immediate notification. However, there are instances where an immediate response is not required and a sender may desire to be courteous and not disturb the receiver. Consider the following examples.

Late one evening, a sender determines a need to send an important message to a team member. Rather than waiting until the next morning to send the message, potentially forgetting about the problem altogether, the sender wants to send it right away with the hope of receiving a reply at the receiving team member's earliest convenience. The receiving team member normally carries a mobile device at all times. The receiving team member receives the message on the member's mobile device but in many cases would rather not be disturbed by incoming messages so late in the evening.

Consider as well users who would like the freedom to use their mobile device at certain times during the day but would rather not be interrupted by incoming data in that period unless the data is marked as urgent.

Accordingly, there is a resulting need for a method and apparatus that addresses one or more of these shortcomings.

SUMMARY

The present invention relates to a method and apparatus for controlling user notification of events in a mobile device.

A sender-specified courtesy notification scheme to delay notification by a receiving device of the receipt of a data message is disclosed. A sender may specify a notification parameter defining a delay and send the parameter in association with the data message to a recipient. The recipient's receiving device evaluates the parameter and notifies in response. Local notification data defined by the recipient may also be evaluated. Received data messages subject to delayed notification may be hidden by the receiving device or quietly displayed (e.g. as per other received messages) until the expiry of the delay. Notification parameters and data can be formulated as one or more rules which may take into account the current location of the receiving device. A notification delay may be ignored in certain situations depending on recent use of the receiving device. Persons of ordinary skill in the art will recognize mobile device, method, computer program product and other aspects of the invention from the embodiments shown and described.

BRIEF DESCRIPTION OF THE DRAWINGS

Embodiments of the present invention will now be described by way of example with reference to attached figures, wherein.

DETAILED DESCRIPTION

Figure 1:
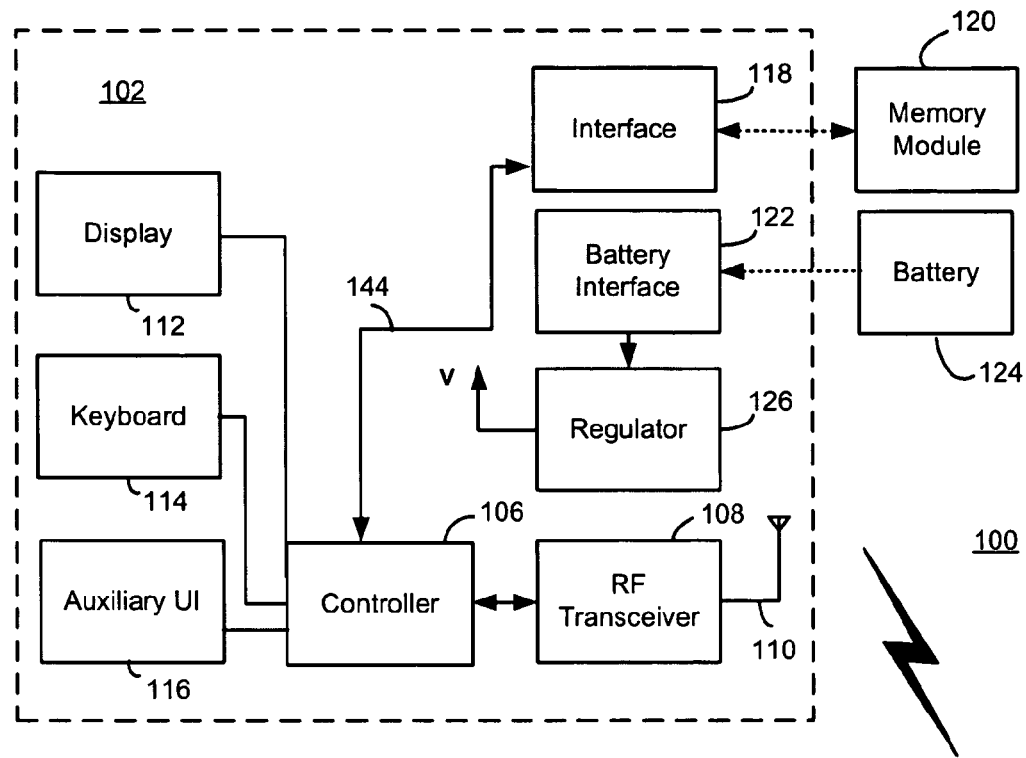
FIG. 1 is a block diagram which illustrates pertinent components of a wireless communication network and a mobile device which communicates within this network.
Figure 1:
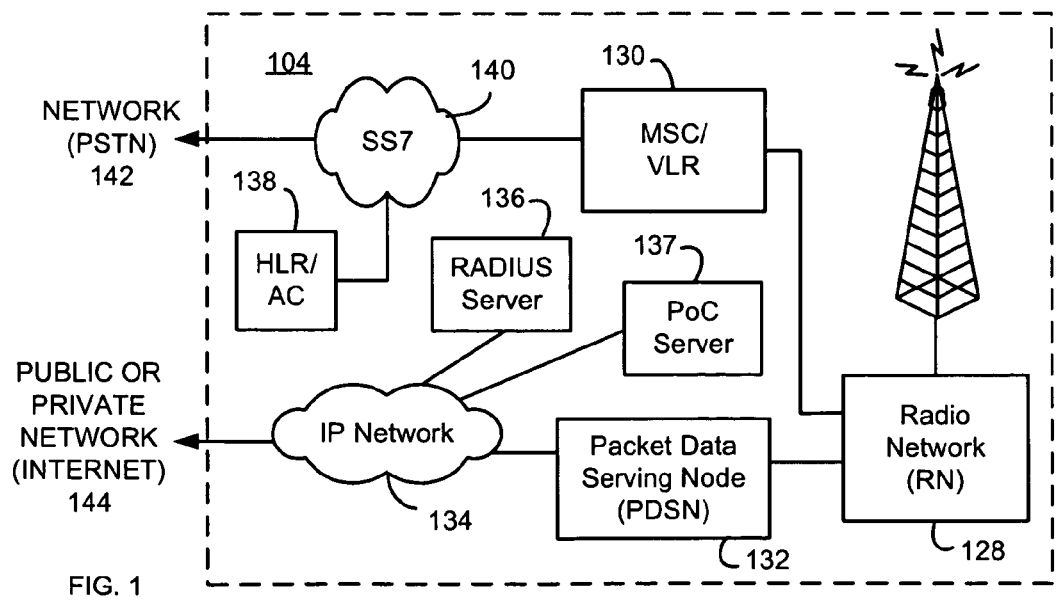

FIG. 1 is a block diagram of a communication system 100 which includes a mobile device 102 which communicates through a wireless communication network 104. Mobile device 102 preferably includes a visual display 112, a keyboard 114, and perhaps one or more auxiliary user interfaces (UI) 116, each of which is coupled to a controller 106. Controller 106 is also coupled to radio frequency (RF) transceiver circuitry 108 and an antenna 110.

Typically, controller 106 is embodied as a central processing unit (CPU) which runs operating system software in a memory component (not shown). Controller 106 will normally control overall operation of mobile device 102, whereas signal processing operations associated with communication functions are typically performed in RF transceiver circuitry 108. Controller 106 interfaces with device display 112 to display received information, stored information, user inputs, and the like. Keyboard 114, which may be a telephone type keypad or full alphanumeric keyboard, is normally provided for entering data for storage in mobile device 102, information for transmission to network 104, a. telephone number to place a telephone call, commands to be executed on mobile device 102, and possibly other or different user inputs.

Mobile device 102 sends communication signals to and receives communication signals from network 104 over a wireless link via antenna 110. RF transceiver circuitry 108 performs functions similar to those of a radio network (RN) 128, including for example modulation/demodulation and possibly encoding/decoding and encryption/decryption. It is also contemplated that RF transceiver circuitry 108 may perform certain functions in addition to those performed by RN 128. It will be apparent to those skilled in the art that RF transceiver circuitry 108 will be adapted to particular wireless network or networks in which mobile device 102 is intended to operate.

Mobile device 102 includes a battery interface 122 for receiving one or more rechargeable batteries 124. Battery 124 provides electrical power to electrical circuitry in mobile device 102, and battery interface 122 provides for a mechanical and electrical connection for battery 124. Battery interface 122 is coupled to a regulator 126 which regulates power to the device. When mobile device 102 is fully operational, an RF transmitter of RF transceiver circuitry 108 is typically turned on only when it is sending to network, and is otherwise turned off to conserve resources. Similarly, an RF receiver of RF transceiver circuitry 108 is typically periodically turned off to conserve power until it is needed to receive signals or information (if at all) during designated time periods.

Mobile device 102 operates using a memory module 120, such as a Subscriber Identity Module (SIM) or a Removable User Identity Module (R-UIM), which is connected to or inserted in mobile device 102 at an interface 118. As an alternative to a SIM or an R-UIM, mobile device 102 may operate based on configuration data programmed by a service provider into an internal memory which is a non-volatile memory. Mobile device 102 may consist of a single unit, such as a data communication device, a cellular telephone, a multiple-function communication device with data and voice communication capabilities, a personal digital assistant (PDA) enabled for wireless communication, or a computer incorporating an internal modem. Alternatively, mobile device 102 may be a multiple-module unit comprising a plurality of separate components, including but in no way limited to a computer or other device connected to a wireless modem. In particular, for example, in the mobile device block diagram of FIG. 1, RF transceiver circuitry 108 and antenna 110 may be implemented as a radio modem unit that may be inserted into a port on a laptop computer. In this case, the laptop computer would include display 112, keyboard 114, and one or more auxiliary UIs 116, and controller 106 may remain within the radio modem unit that communicates with the computer's CPU or be embodied as the computer's CPU. It is also contemplated that a computer or other equipment not normally capable of wireless communication may be adapted to connect to and effectively assume control of RF transceiver circuitry 108 and antenna 110 of a single-unit device such as one of those described above. Such a mobile device 102 may have a more particular implementation as described later in relation to mobile device 202 of FIG. 2.

Mobile device 102 communicates in and through wireless communication network 104. In the embodiment of FIG. 1, wireless network 104 is a Third Generation (3G) supported network based on Code Division Multiple Access (CDMA) technologies. In particular, wireless network 104 is a CDMA2000 network which includes fixed network components coupled as shown in FIG. 1. Wireless network 104 of the CDMA2000-type includes a Radio Network (RN) 128, a Mobile Switching Center (MSC) 130, a Signaling System 7 (SS7) network 140, a Home Location Register/Authentication Center (HLR/AC) 138, a Packet Data Serving Node (PDSN) 132, an IP network 134, and a Remote Authentication Dial-In User Service (RADIUS) server 136. SS7 network 140 is communicatively coupled to a network 142 (such as a Public Switched Telephone Network or PSTN), whereas IP network is communicatively coupled to a network 144 (such as the Internet). Wireless network 104 is exemplary and persons of ordinary skill in the art will appreciate that other wireless network architectures and standards may be used.

During operation, mobile device 102 communicates with RN 128 which performs functions such as call-setup, call processing, and mobility management. RN 128 includes a plurality of base station transceiver systems that provide wireless network coverage for a particular coverage area commonly referred to as a "cell". A given base station transceiver system of RN 128, such as the one shown in FIG. 1, transmits communication signals to and receives communication signals from mobile devices within its cell. The base station transceiver system normally performs such functions as modulation and possibly encoding and/or encryption of signals to be transmitted to the mobile device in accordance with particular, usually predetermined, communication protocols and parameters, under control of its controller. The base station transceiver system similarly demodulates and possibly decodes and decrypts, if necessary, any communication signals received from mobile device 102 within its cell. Communication protocols and parameters may vary between different networks. For example, one network may employ a different modulation scheme and operate at different frequencies than other networks. The underlying services may also differ based on its particular protocol revision.

The wireless link shown in communication system 100 of FIG. 1 represents one or more different channels, typically different radio frequency (RF) channels, and associated protocols used between wireless network 104 and mobile device 102. An RF channel is a limited resource that must be conserved, typically due to limits in overall bandwidth and a limited battery power of mobile device 102. Those skilled in the art will appreciate that a wireless network in actual practice may include hundreds of cells depending upon desired overall expanse of network coverage. All pertinent components may be connected by multiple switches and routers (not shown), controlled by multiple network controllers.

For all mobile devices 102 registered with a network operator, permanent data (such as mobile device 102 user's profile) as well as temporary data (such as a mobile device's 102 current location) are stored in a HLR/AC 138. In case of a voice call to mobile device 102, HLR/AC 138 is queried to determine the current location of mobile device 102. A Visitor Location Register (VLR) of MSC 130 is responsible for a group of location areas and stores the data of those mobile devices that are currently in its area of responsibility. This includes parts of the permanent mobile device data that have been transmitted from HLR/AC 138 to the VLR for faster access. However, the VLR of MSC 130 may also assign and store local data, such as temporary identifications. Mobile device 102 is also authenticated on system access by HLR/AC 138. In order to provide packet data services to mobile device 102 in a CDMA2000-based network, RN 128 communicates with PDSN 132. PDSN 132 provides access to the Internet 144 (or intranets, Wireless Application Protocol (WAP) servers, etc.) through IP network 134. PDSN 132 also provides foreign agent (FA) functionality in mobile IP networks as well as packet transport for virtual private networking. PDSN 132 has a range of IP addresses and performs IP address management, session maintenance, and optional caching. RADIUS server 136 is responsible for performing functions related to authentication, authorization, and accounting (AAA) of packet data services, and may be referred to as an AAA server.

Wireless communication network 104 also includes a Push-to-talk over Cellular (PoC) server 137 which may be coupled to IP network 134. PoC server 137 operates to facilitate PoC individual and group communication sessions between mobile devices within network 104. A conventional PoC communication session involves a session connection between end users of mobile devices, referred to as session "participants", who communicate one at a time in a half-duplex manner much like conventional walkie-talkies or two-way radios.

Those skilled in the art will appreciate that wireless network 104 may be connected to other systems, possibly including other networks, not explicitly shown in FIG. 1. A network will normally be transmitting at the very least some sort of paging and system information on an ongoing basis, even if there is no actual packet data exchanged. Although the network consists of many parts, these parts all work together to result in certain behaviours at the wireless link.

Figure 2:
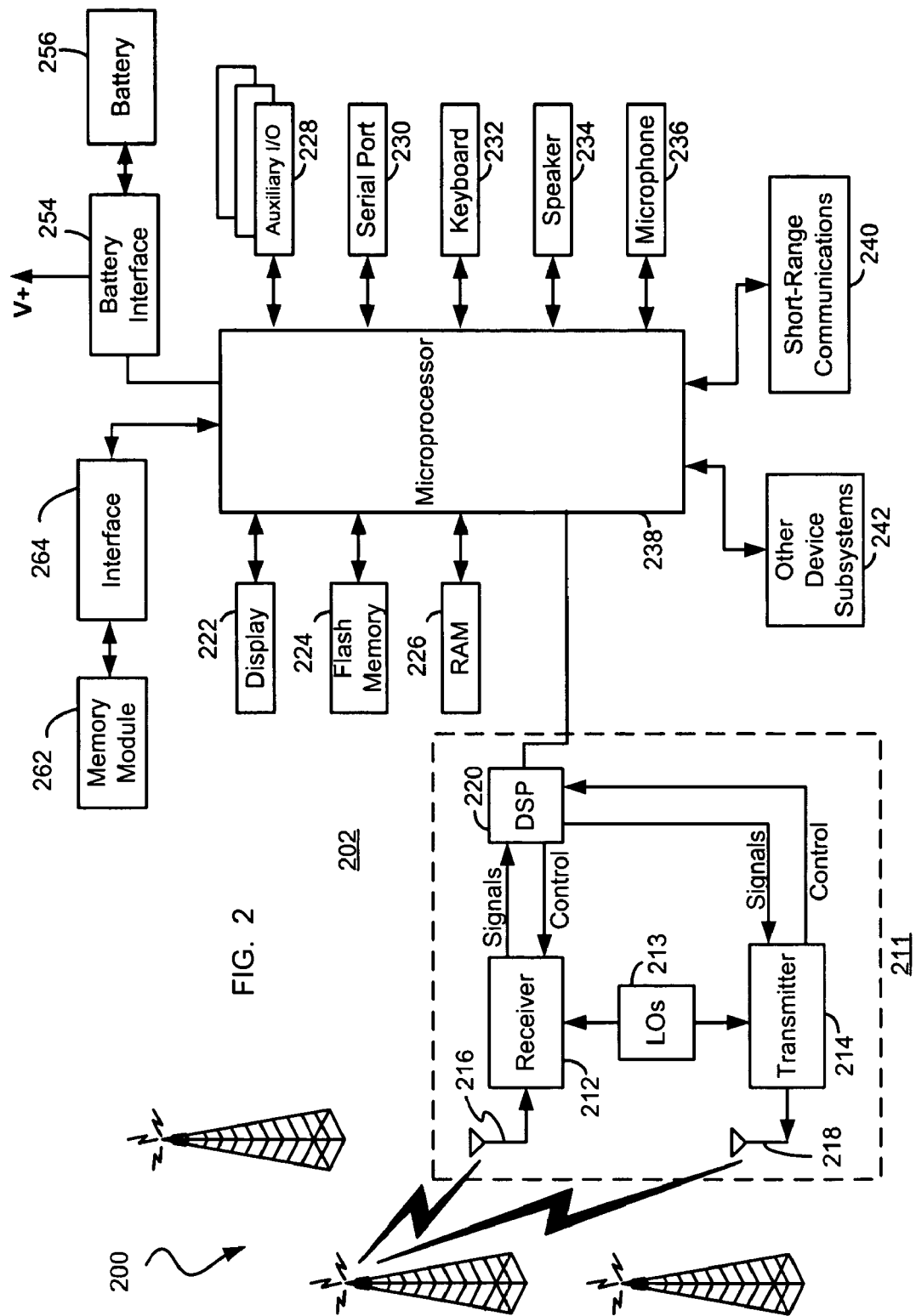
FIG. 2 is a more detailed diagram of the mobile device which may communicate within the wireless communication network.

FIG. 2 is a detailed block diagram of a preferred mobile device 202. Mobile device 202 is preferably a two-way communication device having at least voice and advanced data communication capabilities, including the capability to communicate with other computer systems. Depending on the functionality provided by mobile device 202, it may be referred to as a data messaging device, a two-way pager, a cellular telephone with data messaging capabilities, a wireless Internet appliance, or a data communication device (with or without telephony capabilities). Mobile device 202 may communicate with any one of a plurality of base station transceiver systems 200 within its geographic coverage area.

Mobile device 202 will normally incorporate a communication subsystem 211, which includes a receiver 212, a transmitter 214, and associated components, such as one or more (preferably embedded or internal) antenna elements 216 and 218, local oscillators (LOs) 213, and a processing module such as a digital signal processor (DSP) 220. Communication subsystem 211 is analogous to RF transceiver circuitry 108 and antenna 110 shown in FIG. 1. As will be apparent to those skilled in the field of communications, particular design of communication subsystem 211 depends on the communication network in which mobile device 202 is intended to operate.

Mobile device 202 may send and receive communication signals over the network after required network registration or activation procedures have been completed.

Signals received by antenna 216 through the network are input to receiver 212, which may perform such common receiver functions as signal amplification, frequency down conversion, filtering, channel selection, and like, and in example shown in FIG. 2, analog-to-digital (A/D) conversion. A/D conversion of a received signal allows more complex communication functions such as demodulation and decoding to be performed in DSP 220. In a similar manner, signals to be transmitted are processed, including modulation and encoding, for example, by DSP 220. These DSP-processed signals are input to transmitter 214 for digital-to-analog (D/A) conversion, frequency up conversion, filtering, amplification and transmission over communication network via antenna 218. DSP 220 not only processes communication signals, but also provides for receiver and transmitter control. For example, the gains applied to communication signals in receiver 212 and transmitter 214 may be adaptively controlled through automatic gain control algorithms implemented in DSP 220.

Network access is associated with a subscriber or user of mobile device 202, and therefore mobile device 202 requires a memory module 262, such as a Subscriber Identity Module or "SIM" card or a Removable User Identity Module (R-UIM), to be inserted in or connected to an interface 264 of mobile device 202 in order to operate in the network. Alternatively, memory module 262 may be a non-volatile memory which is programmed with configuration data by a service provider so that mobile device 202 may operate in the network. Since mobile device 202 is a mobile battery-powered device, it also includes a battery interface 254 for receiving one or more rechargeable batteries 256. Such a battery 256 provides electrical power to most if not all electrical circuitry in mobile device 202, and battery interface 254 provides for a mechanical and electrical connection for it. The battery interface 254 is coupled to a regulator (not shown in FIG. 2) which provides power V+to all of the circuitry.

Mobile device 202 includes a microprocessor 238 (which is one implementation of controller 106 of FIG. 1) which controls overall operation of mobile device 202. This control includes network selection techniques of the present application. Communication functions, including at least data and voice communications, are performed through communication subsystem 211. Microprocessor 238 also interacts with additional device subsystems such as a display 222, a flash memory 224, a random access memory (RAM) 226, auxiliary input/output (I/O) subsystems 228, a serial port 230, a keyboard 232, a speaker 234, a microphone 236, a short-range communications subsystem 240, and any other device subsystems generally designated at 242. Some of the subsystems shown in FIG. 2 perform communication-related functions, whereas other subsystems may provide "resident" or on-device functions. Notably, some subsystems, such as keyboard 232 and display 222, for example, may be used for both communication-related functions, such as entering a text message for transmission over a communication network, and device-resident functions such as a calculator or task. list. Operating system software used by microprocessor 238 is preferably stored in a persistent store such as flash memory 224, which may alternatively be a read-only memory (ROM) or similar storage element (not shown). Those skilled in the art will appreciate that the operating system, specific device applications, or parts thereof, may be temporarily loaded into a volatile store such as RAM 226.

Microprocessor 238, in addition to its operating system functions, preferably enables execution of software applications on mobile device 202. A predetermined set of applications which control basic device operations, including at least data and voice communication applications, will normally be installed on mobile device 202 during its manufacture. A preferred application that may be loaded onto mobile device 202 may be a personal information manager (PIM) application having the ability to organize and manage data items relating to user such as, but not limited to, e-mail, calendar events, voice mails, appointments, and task items. Naturally, one or more memory stores are available on mobile device 202 and SIM 262 to facilitate storage of PIM data items and other information such as described further herein with reference to FIG. 3.

The PIM application preferably has the ability to send and receive data items via the wireless network. In a preferred embodiment, PIM data items are seamlessly integrated, synchronized, and updated via the wireless network, with the mobile device user's corresponding data items stored and/or associated with a host computer system thereby creating a mirrored host computer on mobile device 202 with respect to such items. This is especially advantageous where the host computer system is the mobile device user's office computer system. Additional applications may also be loaded onto mobile device 202 through network, an auxiliary I/O subsystem 228, serial port 230, short-range communications subsystem 240, or any other suitable subsystem 242, and installed by a user in RAM 226 or preferably a non-volatile store (not shown) for execution by microprocessor 238. Such flexibility in application installation increases the functionality of mobile device 202 and may provide enhanced on-device functions, communication-related functions, or both. For example, secure communication applications may enable electronic commerce functions and other such financial transactions to be performed using mobile device 202.

In a data communication mode, a received signal such as a text message, an e-mail message, or web page download will be processed by communication subsystem 211 and input to microprocessor 238. Microprocessor 238 will preferably further process the signal for output to display 222 or alternatively to auxiliary I/O device 228. A user of mobile device 202 may also compose data items, such as e-mail messages, for example, using keyboard 232 in conjunction with display 222 and possibly auxiliary I/O device 228. Keyboard 232 is preferably a complete alphanumeric keyboard and/or telephone-type keypad. These composed items may be transmitted over a communication network through communication subsystem 211.

For voice communications, the overall operation of mobile device 202 is substantially similar, except that the received signals would be output to speaker 234 and signals for transmission would be generated by microphone 236. Alternative voice or audio I/O subsystems, such as a voice message recording subsystem, may also be implemented on mobile device 202. Although voice or audio signal output is preferably accomplished primarily through speaker 234, display 222 may also be used to provide an indication of the identity of a calling party, duration of a voice call, or other voice call related information, as some examples.

Serial port 230 in FIG. 2 is normally implemented in a personal digital assistant (PDA)-type communication device for which synchronization with a user's desktop computer is a desirable, albeit optional, component. Serial port 230 enables a user to set preferences through an external device or software application and extends the capabilities of mobile device 202 by providing for information or software downloads to mobile device 202 other than through a wireless communication network. The alternate download path may, for example, be used to load an encryption key onto mobile device 202 through a direct and thus reliable and trusted connection to thereby provide secure device communication.

Short-range communications subsystem 240 of FIG. 2 is an additional optional component which provides for communication between mobile device 202 and different systems or devices, which need not necessarily be similar devices. For example, subsystem 240 may include an infrared device and associated circuits and components, or a Bluetooth™ communication module to provide for communication with similarly-enabled systems and devices. Bluetooth™ is a registered trademark of Bluetooth SIG, Inc.

In accordance with an embodiment of the invention, mobile device 202 is a multi-tasking wireless communications device configured for sending and receiving data items and for making and receiving voice calls. To provide a user-friendly environment to control the operation of mobile device 202, an operating system resident on device 202 (not shown) provides a graphical user interface (GUI) having a main screen and a plurality of sub-screens navigable from the main screen.

Figure 3:
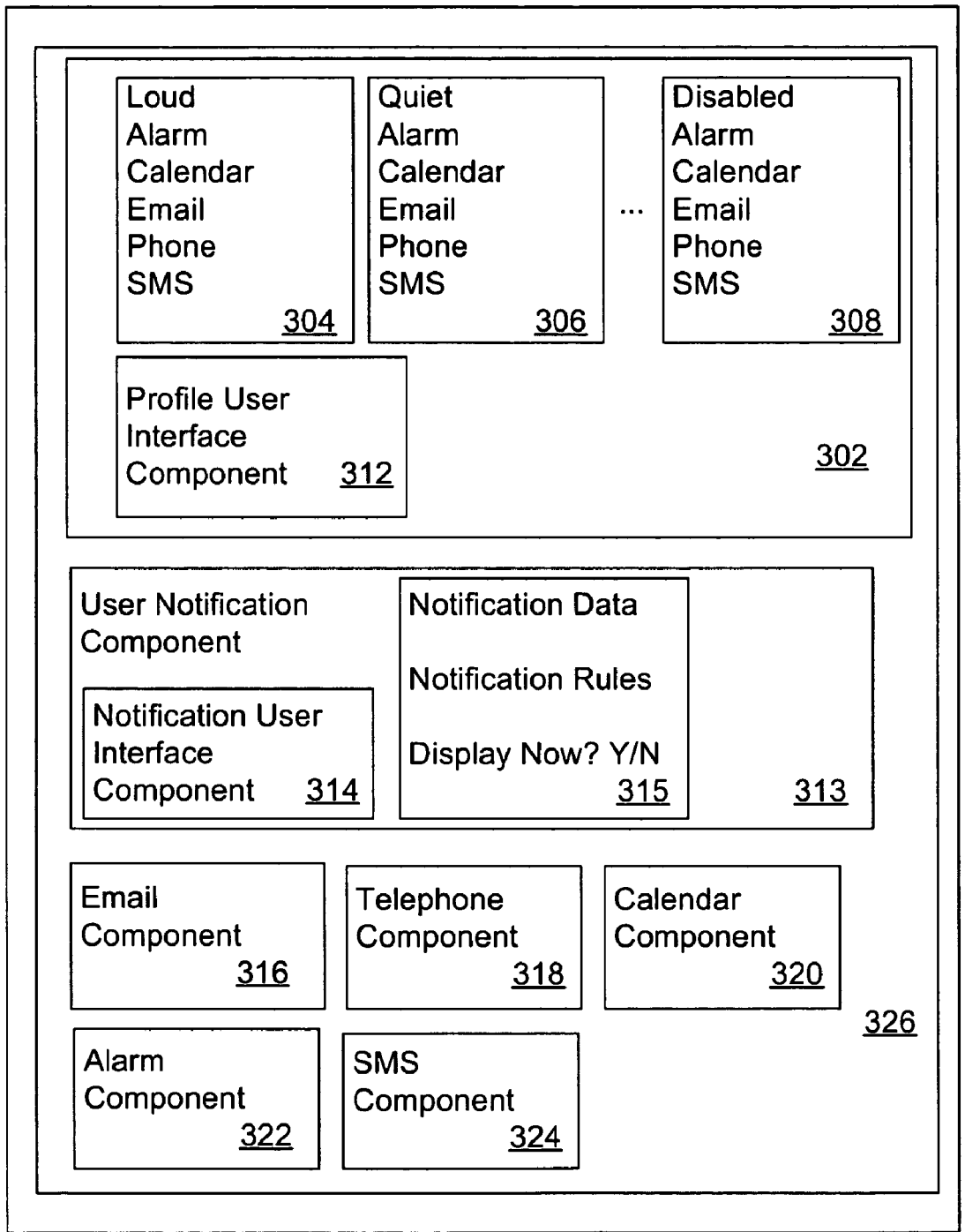
FIG. 3 is a schematic diagram of a memory portion of FIG. 2 in accordance with an embodiment of the invention.

Referring now to FIG. 3, there is an illustration of a memory 300 of device 202, in accordance with an embodiment of the invention, showing various software components for controlling mobile device 202. Memory 300 comprises a PIM application component 326 described previously which includes a plurality of event generating and handling components. Examples of such event generating and handling components include an email component 316, telephone component 318, calendar component 320, alarm component 322 and SMS component 324. Persons of ordinary skill in the art will appreciate that one or more additional components may be included (not shown) such as, an address book component, an IM component and a web browser component and that not all of components 316-324 or others need be included.

PIM application component 326 also provides a user notification component 313 for handling event notification on behalf of each of components 316-324. User notification component 314 interfaces with various output or I/O devices of device 202 such as display 222, auxiliary I/O devices 228 and speaker 234. Additionally, user notification component 313 cooperates with a profile component 302 which manages profiles, such as profiles 304-308, defining user preferences for how various events are to be notified by device 202. User notification component may also provide a notification user interface component 314 and various notification data 315 for defining and managing delayed notification of events in accordance with an embodiment of the invention.

Profile component 302 also includes a user interface component 312 for configuring profiles 304-308. In this example embodiment, there are shown three profiles 304-308. Each profile includes options for defining how the user is to be notified for each of the event generating components, namely alarm, calendar, email, phone and SMS options. Profiles are useful to define options for different user scenarios such as different ambient environments, locations or times where a user may desire particular user notification. For example, there is shown a profile 304 including a name identifier "Loud" indicating that the notification options of this group are selected to maximize the intrusiveness of the notification such as increasing volume for audible notifications. Similarly there is a profile 306 having the identifier "Quiet" for defining options which minimize intrusiveness. Finally there is shown a Disabled profile 308 where the options are defined to turn off notification until re-enabled by user action or otherwise. Preferably, profile component 302 and user interface component 312 permit the definition of additional (i.e. new) profiles to suit user needs.

Persons of ordinary skill in the art will appreciate that a plurality of notification options may be defined for various event types such as email events. For example, the receipt of level one or important email messages may be notified differently from regular email message events. Details of the notification options per se are omitted and are not important to the scope of the invention.

In accordance with an embodiment of the invention, there is provided a manner of delaying notification of an event, such as the receipt of a data communication. In the example embodiment, user notification component 313 includes a user interface 314 for defining notification data 315. Such data may include one or more notification rules to be evaluated upon the occurrence of an event, (e.g. new email), to determine whether to delay event notification. A rule may be defined with reference to a time period (e.g. start and end times during which notifications are to be delay), location information (e.g. if at location X, e.g. a church, movie theatre, etc. then delay), a combination of time and location information (e.g. if after 9 PM and not at office, delay) or other information (e.g. calendar data such as during a meeting). Rules may also evaluate a characteristic of the event. For example notification may be forced when a message is urgent or from a specified sender, etc., even if notification is indicated to be otherwise delayed. Notification for a particular received message may be delayed in response to a notification parameter of the received message as discussed below.

Should a rule be defined with reference to a mobile device location, the current location of mobile device 202 may be determined relative to a base station 200 with which the mobile device 202 is in communication. For mobile devices 202 including more precise location determining devices such as a Global Positioning Satellite (GPS) subsystem (not shown), the current location may be determined using information from such a device.

Figure 4:
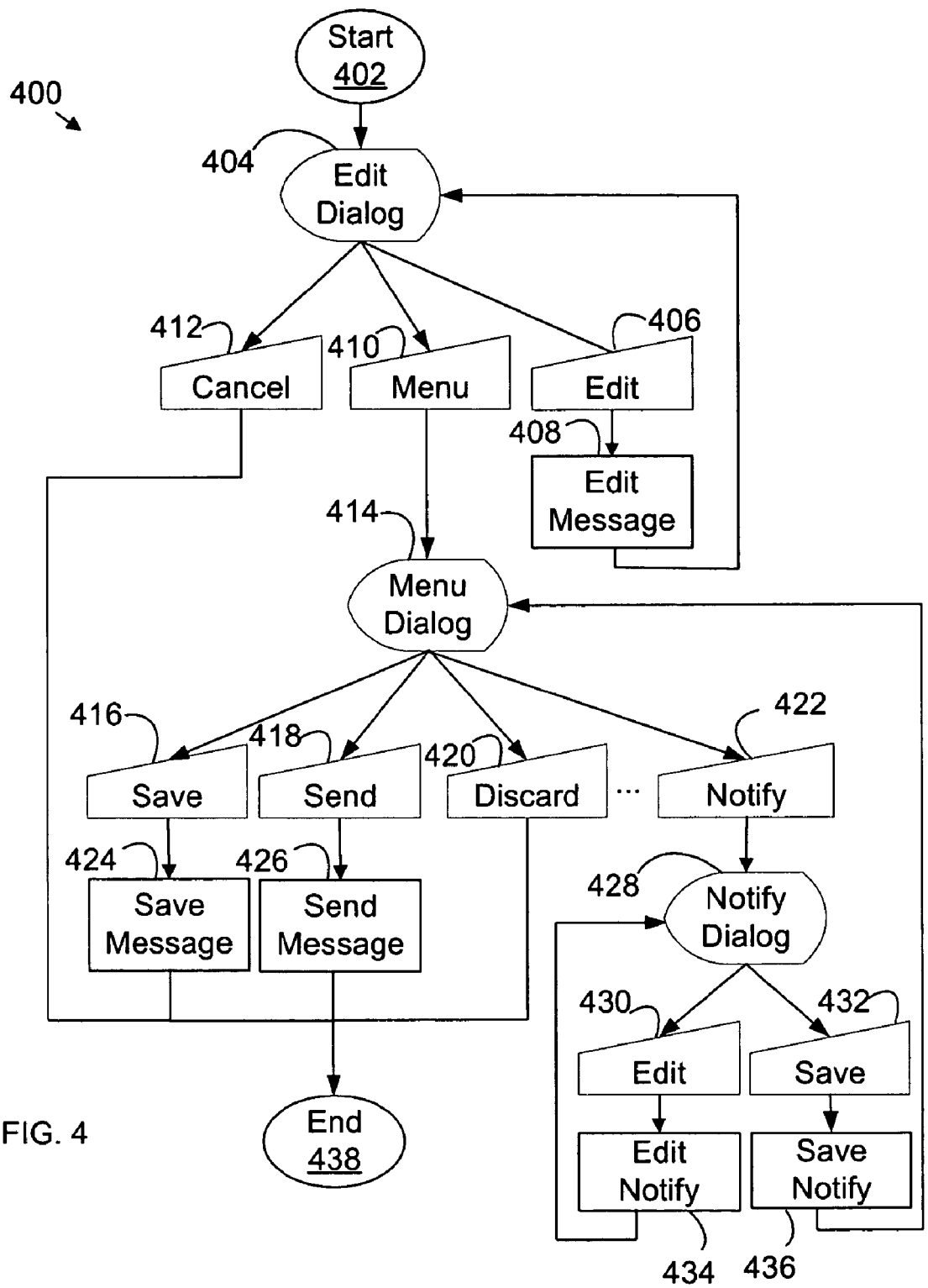
FIG. 4 is a flowchart which shows operations for a user interface in accordance with an embodiment of the invention.

FIG. 4 is a flowchart which describes operations of a method in accordance with an embodiment of the invention for a user interface to mobile device 202 for composing a data message and configuring a notification parameter for a message to be sent by mobile device 202.

Beginning at a start block 402 of FIG. 4, operations 400 commence, for example, by invoking email component 316 comprising an email composition component (not shown) from a main screen (not shown) of a graphical user interface (GUI) visible on display 222. At step 404 a screen showing an edit dialog for a new message is displayed to the user. From this main screen, a user may navigate about the new message using keyboard 232 or other auxiliary I/O devices 228 such as a wheel for moving a cursor or focus about the screen.

A user may chose among a plurality of options for a new message such as editing the message (step 406), opening a menu for additional options (step 410), or canceling the new message (step 412). If a user chooses to edit the message (step 406), the edits are maintained (step 408) to create a composed message in anticipation of sending to a recipient.

The user may open a menu (step 410) to initiate a variety of options from a menu dialog (step 414). Menu dialog 414 may facilitate user selections for a Save (step 416), a Send (step 418), a Discard (step 420) and a Notify (step 422) action among others such as message addressing features, indicating importance, etc. (all not shown). Selecting discard at step 420 draws the edit dialog 404 to an end (step 438). Choosing send at step 418 sends the message at step 426 which may include saving a copy in a sent items component of a message centre provided by PIM 326 (not shown). A Save selection at step 416 invokes a save activity at step 424 to retain the message for later disposition but ends operations 400 at step 438.

In the example embodiment, operations 400 via edit dialog and menu dialog steps 402, 404, 410, 414 and 414 permits a user to choose to specify a notification delay, configuring a notification parameter for sending in association with the message via send steps 418, 426. Selecting notify at step 422 invokes a dialog (step 428) for defining a notification parameter (e.g. a rule) for the message. A user may chose to edit the parameter (steps 430-434) and return to the notify dialog at step 428. The parameter may be saved via steps 432-436 and the menu dialog for message composition resumed at step 414. Though not shown, the notify dialog may permit a cancel option to discard unsaved notification parameter inputs.

The notification parameter may take a variety of forms a will be apparent to those of ordinary skill in the art. For example, it may merely comprise a time a date component indicating an expiry time for the delay. It may a certain amount of time (e.g. hours) relative to the send time for the message. It may be more complex defining a rule (e.g. if !(7:00 AM <= DEVICETIME<= 9:00 PM) and !(location=OFFICE) then delay). The parameter may define a code (e.g. 1, 2 or 3) indicating a predefined rule to be applied by the receiving device.

By default, new messages have no predefined notification parameter associated with the message. Thus unless a parameter is defined, the default is notification in accordance with the settings of the receiving device. Should a notification parameter be defined such as by using dialog steps 428-436, the parameter may be sent in association with the message and for those receiving devices adapted to interpret such parameters, notification at the receiving device may be set in accordance with local notification rules, if any, and the received parameter.

The parameter may be associated with the message in a variety of ways. Preferably the parameter is sent in association with the message, for example, as a portion of a user-defined field in a header of the message. Techniques in accordance with the "Standard for the Format of ARPA Internet Text Messages", RFC 822, Aug. 13, 1982 (http://www.faqs.org/rfcs/rfc822.html) may be employed in appropriate cases. This standard provides that users are free to define and use additional header fields. Such fields are to have unique names and have a syntax which is in accordance with the specification.

Figure 5:
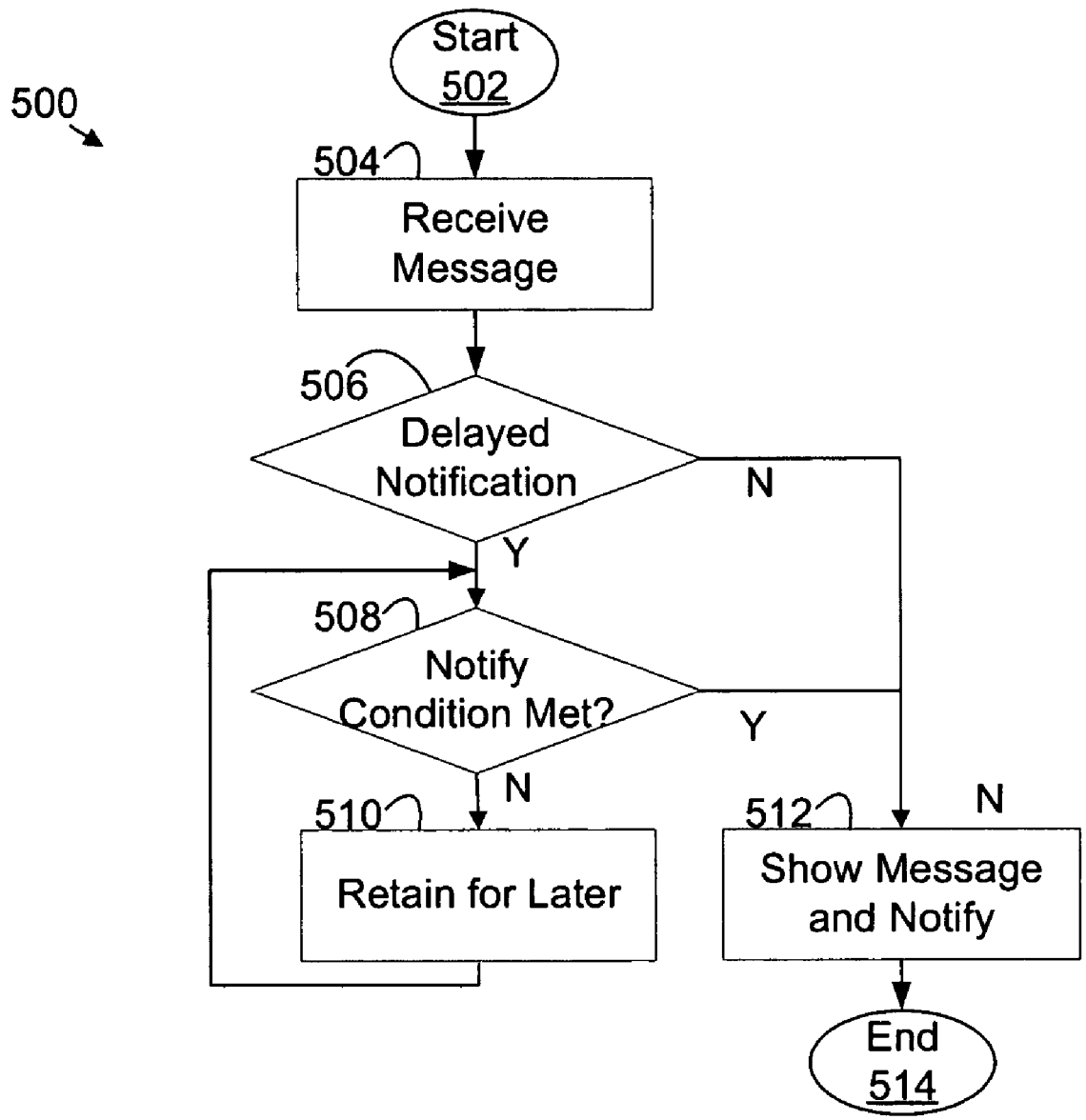
FIG. 5 is a flowchart which shows operations for controlling the wireless communication device in accordance with an embodiment of the invention.

FIG. 5 illustrates a flowchart showing operations 500 of a method in accordance with an embodiment of the invention to control the operation of mobile device 202. FIG. 6 represents operations 500 for determining notification in accordance with a notification parameter (e.g. a rule) received in association with the message. Operations start at step 502 and at step 504 a message is received. At step 506, the received notification parameter, if any, is evaluated to determine if notification is delayed. If there is no delay, via no branch to step 512, the received message is shown in the user's inbox and notification proceeds in accordance with profiles 304-308. Operations 500 then end (step 514). In there is a delay notification parameter received, via yes branch to step 508, the parameter is evaluated and a determination made whether the notification condition established by the parameter is met. If yes, operations proceed via step 512, as discussed, to show (if necessary) and notify of the message. If no, via branch to step 510, the message is retained but not displayed or notified. Operations loop (e.g. after a time delay) to step 508.

Persons of skill in the art will appreciate that should device 202 be adapted to have local notification data 315, such may be reviewed at or about step 512 to determine a further delay in notification in a similar manner for preferences of the user. Though not shown, operations 500 may be responsive to a "Display Now" parameter of data 315 to display the message immediately even if its notification is otherwise delayed. That is the message may be placed in a received messages folder or other message content display means for serendipitous viewing by the recipient but without the addition of an immediate audible, tactile or other visual notification. Such additional notification is delayed in accordance with the received parameter or any local notification preferences.

Optionally, notification delays may be ignored in certain situations that may be determined with reference to recent use of the device. For example, operations 500 may be modified at or about step 508 to ignore a received notification parameter providing a courtesy delay if the receiving user has recently used the receiving device (particularly checking messages) within the last few minutes. In such a case, the receiving device can assume that the receiving user is still available (not sleeping, etc.) and can generate a notification.

Advantageously, there is disclosed a sender-specified courtesy notification scheme to delay notification of a data message by the receiving device. While, as an alternative, the sender could delay sending the message so as not to bother the recipient, the sender would run the risk of being or going out of wireless network coverage at the delayed time of sending, or, perhaps, the sender may forget to send the message at the delayed time. Thus, the proposed scheme permits early transmission of the message and early receipt to maximize the opportunity to successfully communicate the message before the expiry of the delay.

Further, the proposed notification scheme proposes two notification scenarios:

a. Delayed messages (or any received data for that matter) can be 'hidden' on the receiving device until the notification period is up. For receiving handhelds, this gives the user the option of managing their device without being interrupted by extra data.

b. Delayed messages can be 'quietly' placed in the user's inbox to be reviewed by the receiving user at their convenience.

Moreover, in accordance with the teachings herein, either sending or receiving devices may define notification data to enable delayed notification. Notification data can be formulated as one or more rules. The rules may take into account the current location of the receiving device. For example a receiving user may define notification in terms of time and location: if it is after midnight and I am at home then switch to courtesy time delaying notification until the next morning. Notification delays may be ignored in certain situations that may be determined with reference to recent use of the device. By way of example, if the receiving user has recently used the receiving device handheld within the last few minutes, the receiving device can assume that the receiving user is still available (not sleeping, etc.) and can still generate a notification.

The above-described embodiments of the present application are intended to be examples only. Those of skill in the art may effect alterations, modifications and variations to the particular embodiments without departing from the scope of the application. The invention described herein in the recited claims intends to cover and embrace all suitable changes in technology.

What is claimed is:

1. A method of controlling notification of a data communication to a user of a mobile data communications device, the method comprising steps of:
   receiving the data communication to be notified to the user;
   storing at least one of: location information specifying a notification location where the user is to be notified of the data communication and time information specifying a notification time when the user is to be notified of the data communication;
   storing the received data communication on the user's mobile device to thereby delay notification of the data communication until the mobile device has ascertained the at least one of the specified notification location and the specified notification time is satisfied; and
   determining whether the mobile device has been recently in use;
      upon determining that the mobile device has not been recently in use, notifying the user of the received data communication when the at least one of the specified notification location and the specified notification time is satisfied;
      upon determining that the mobile device has been recently in use, forcing immediate notification of the received data communication even when the at least one of the specified notification location and the specified notification time is not satisfied;
   wherein the data communication comprises notification data specified by a sender of the data communication, the notification data comprising an urgency parameter set by the sender for forcing immediate notification of the received data communication to the user even when the at least one of the specified notification location and the specified notification time is not satisfied.

2. The method of claim 1 wherein determining whether the mobile device has been recently in use comprises determining whether the user has recently checked incoming messages.

3. The method of claim 1 further comprising a step of enabling the user to trigger a Display Now function to cause the received data communication to be immediately notified to the user notwithstanding any notification parameters specified by the sender.

4. The method of claim 1 wherein the urgency parameter only forces immediate notification for data communications sent by one of a plurality of predetermined senders specified by the user of the mobile device.

5. The method of claim 1 wherein the notification data further comprises a time parameter set by the sender specifying a time for forcing notification of the received data communication.

6. The method of claim 5 wherein the time parameter set by the sender specifies one or more time periods during which notification is to be delayed until the one or more time periods elapse.

7. The method of claim 1 wherein the step of storing the received data communication comprises a step of hiding the received data communication on the mobile device until notification is to be effected.

8. The method of claim 1 wherein the received data communication comprises an electronic mail (e-mail) message and wherein the step of storing the received data communication comprises a step of quietly delivering the e-mail to an inbox of the user without alerting the user until notification is to be effected.

9. A computer program product comprising code embedded on a non-transitory computer-readable medium adapted to cause a mobile data communications device to perform the steps of claim 1 when the computer program product is loaded into memory and executed on a processor of the mobile data communications device.

10. The computer program product of claim 9 wherein the determining whether the mobile device has been recently in use comprises determining whether the user has recently checked incoming messages.

11. The computer program product of claim 9 further comprising code embedded on the non-transitory computer-readable medium adapted to cause a mobile data communications device to enable the user to trigger a Display Now function to cause the received data communication to be immediately notified to the user notwithstanding any notification parameters specified by the sender.

12. The computer program product of claim 9 wherein the urgency parameter only forces immediate notification for data communications sent by one of a plurality of predetermined senders specified by the user of the mobile device.

13. The computer program product of claim 9 wherein the notification data further comprises a time parameter set by the sender specifying a time for forcing notification of the received data communication.

14. The computer program product of claim 13 wherein the time parameter set by the sender specifies one or more time periods during which notification is to be delayed until the one or more time periods elapse.

15. The computer program product of claim 9 wherein the step of storing the received data communication comprises a step of hiding the received data communication on the mobile device until notification is to be effected.

16. The computer program product of claim 9 wherein the received data communication comprises an electronic mail (e-mail) message and wherein the step of storing the received data communication comprises a step of quietly delivering the e-mail to an inbox of the user without alerting the user until notification is to be effected.

\* \* \* \* \*

UNITED STATES PATENT AND TRADEMARK OFFICE
CERTIFICATE OF CORRECTION

| | | |
|---|---|---|
| PATENT NO. | : 8,073,495 B2 | Page 1 of 1 |
| APPLICATION NO. | : 12/876578 | |
| DATED | : December 6, 2011 | |
| INVENTOR(S) | : Denny Chiu, Ahmed E. Hassan and John F. Wilson | |

It is certified that error appears in the above-identified patent and that said Letters Patent is hereby corrected as shown below:

On the Title Page
The section Related U.S. Application Data, Item (63) should be replaced with the following:

Related U.S. Application Data
(63) Continuation of application No. 11/564,900, filed on Nov. 30, 2006, now Pat. No. 7,813,719, which is a continuation of application No. 10/889,893, filed Jul. 12, 2004.

Signed and Sealed this
Twenty-third Day of October, 2012

David J. Kappos
*Director of the United States Patent and Trademark Office*